US008407128B2

(12) United States Patent
Tunney

(10) Patent No.: US 8,407,128 B2
(45) Date of Patent: Mar. 26, 2013

(54) SYSTEMS AND METHODS FOR FOREIGN EXCHANGE RISK MANAGEMENT

(75) Inventor: Jono Tunney, San Francisco, CA (US)

(73) Assignee: Atlas Risk Advisory Ltd, Dublin (IE)

( * ) Notice: Subject to any disclaimer, the term of this patent is extended or adjusted under 35 U.S.C. 154(b) by 0 days.

(21) Appl. No.: 13/083,198

(22) Filed: Apr. 8, 2011

(65) Prior Publication Data

US 2012/0259758 A1  Oct. 11, 2012

(51) Int. Cl.
*G06Q 40/00* (2006.01)
(52) U.S. Cl. .......................................... 705/37; 705/40
(58) Field of Classification Search ............... 705/10–44
See application file for complete search history.

(56) References Cited

U.S. PATENT DOCUMENTS

| | | | | |
|---|---|---|---|---|
| 6,938,010 | B1 * | 8/2005 | Everson et al. | 705/36 R |
| 7,533,054 | B2 * | 5/2009 | Hausman et al. | 705/37 |
| 7,756,896 | B1 * | 7/2010 | Feingold | 707/791 |
| 7,908,199 | B2 * | 3/2011 | Neff et al. | 705/37 |
| 7,987,126 | B2 * | 7/2011 | Connors | 705/35 |
| 8,296,220 | B2 * | 10/2012 | Almeida et al. | 705/37 |
| 2002/0099651 | A1 * | 7/2002 | May | 705/38 |
| 2003/0236738 | A1 * | 12/2003 | Lange et al. | 705/37 |
| 2004/0111358 | A1 * | 6/2004 | Lange et al. | 705/37 |
| 2004/0193524 | A1 * | 9/2004 | Almeida et al. | 705/36 |
| 2005/0289042 | A1 * | 12/2005 | Friesen | 705/37 |
| 2006/0041498 | A1 * | 2/2006 | Hausman et al. | 705/37 |
| 2007/0294158 | A1 * | 12/2007 | Patel et al. | 705/36 R |

\* cited by examiner

*Primary Examiner* — Frantzy Poinvil
(74) *Attorney, Agent, or Firm* — Sheppard, Mullin, Richter & Hampton LLP

(57) ABSTRACT

An exemplary method may comprise forecasting a foreign exchange exposure for first and second periods of time, hedging risk based on the forecasts of the foreign exchange exposure, the hedging based on the forecasts of the foreign exchange exposure for the first and second periods of time, wherein hedging is performed utilizing currency contracts with a single maturity date in a single month, retrieving information in real-time from a database of foreign currency contracts to confirm that the risk has been hedged, hedging changes in foreign exchange exposure that result from changes in the forecast of the foreign exchange exposure for the second period of time, wherein the hedging is performed utilizing currency contracts with the single maturity date in the single month, and displaying a comparison of results of hedging with results of accounting from enterprise resource planning (ERP) system.

21 Claims, 7 Drawing Sheets

SYSTEMS AND METHODS FOR FOREIGN EXCHANGE RISK MANAGEMENT

BACKGROUND

1. Field of the Invention

The present invention(s) generally relate to foreign exchange risk management systems. More particularly, the invention(s) relate to systems and methods for hedging foreign exchange exposure.

2. Description of Related Art

Business entities that conduct business internationally and/or are associated with foreign entities generally have business dealings in multiple currencies. For example, it is not uncommon where transactions in a foreign country are conducted in a different currency than the functional currency of the entity or a different currency than the currency used for financial statements and reporting of the parent entity. As a result, fluctuation in foreign exchange rates may lead to gains or losses.

Business entities that have gains or losses due to business transactions conducted in a foreign currency often have "exposure" that varies with the value of the transaction. Exposure is the degree of risk involved with either actually holding account balances in foreign currencies or having a forecast of holding account balances in foreign currencies. For example, exchange rate exposure is the risk associated with uncertain exchange rates. Three types of risk are transaction exposure, remeasurement exposure, and economic exposure. Transaction exposure is the risk that the value of a transaction will change because of exchange rate movements between the date of the transaction and the date of the settlement. Remeasurement exposure is the risk that arises from the remeasurement of the non-functional assets and liabilities back into a balance sheet represented in functional currency. Economic exposure is the future exposure of a business that is engaged in selling or buying goods in foreign currency to the risks resulting from changes in exchange rates.

Many companies are either unaware of currency exposure or are unable effectively manage currency value fluctuation. Even companies that are aware of currency value fluctuation may encounter difficulties and inefficiencies in identifying and managing the risk.

To offset the impact of the exposure, business entities forecast the exposure and engage in hedging activities by entering into foreign exchange (FX) contracts that can be used to guarantee the value of a transaction in a specific currency up to a future date. Previous hedging activities, however, are often inaccurate and fail to identify and effectively manage the currency value fluctuation.

SUMMARY OF THE INVENTION

In various embodiments, a method for foreign exchange risk management may have a hedging system and a cash settlement process. The hedging system may have a first hedging process and a second hedging process, where the first hedging process includes the steps of obtaining first business entity data, obtaining first FX rate data, obtaining first FX contract data, calculating, using a microprocessor, a first accounting period (AP1) balance sheet exposure, and hedging the first AP1 balance sheet exposure. The first business entity data may be obtained from an enterprise resource planning system (ERP) or an online analytical processing (OLAP) system. The first FX contract data and FX rate data may be obtained from a treasury management system (TMS).

In some embodiments, a first AP1 balance sheet exposure is the difference between a combination of an existing accounting period (AP0) balance sheet FX contracts, existing AP1 income statement FX contracts, and a first AP1 balance sheet forecast. The first AP1 balance sheet forecast may be the sum of an AP0 balance sheet forecast and an AP1 forecast transactions. The AP1 forecast transactions may be the sum of a first AP1 income statement forecast and a first AP1 accrual forecast. Further, the AP0 balance sheet forecast may be the sum of an AP0 to date balance sheet and a remainder AP0 forecasted transactions.

The first AP1 balance sheet exposure may be hedged by calculating the first adjustment balance sheet FX contracts and executing the first adjustment balance sheet FX contracts. The first hedging process may include calculating first portfolio AP1 balance sheet FX contracts. A first portfolio of AP1 balance sheet FX contracts may be the sum of first adjustment balance sheet FX contracts, existing AP0 balance sheet FX contracts, and existing AP1 income statement FX contracts.

The second hedging process may comprise obtaining second business entity data, obtaining second FX rate data, obtaining second FX contract data, calculating a second AP1 balance sheet exposure, and hedging the second AP1 balance sheet exposure. The second business entity data may be obtained from an ERP system or from an OLAP system. A second FX contract data and FX rate data may be obtained from a TMS.

A second AP1 balance sheet exposure may be the difference between a first portfolio AP1 balance sheet FX contracts and a second AP1 balance sheet forecast. A second AP1 balance sheet forecast may be the sum of a final AP0 balance sheet and a second AP1 transactions forecast. The second AP1 transactions forecast may be the sum of a second AP1 income statement forecast and a second AP1 accrual forecast.

The second AP1 balance sheet exposure may be hedged by calculating a second adjustment balance sheet FX contracts and executing the second adjustment balance sheet FX contracts. The second hedging process may comprise calculating a second portfolio AP1 balance sheet FX contracts. In some embodiments, the second portfolio of AP1 balance sheet FX contracts may be the sum of the second adjustment balance sheet FX contracts and the first portfolio of AP1 balance sheet FX contracts.

The cash settlement process may include obtaining final cash settlement amount, obtaining FX contracts data, calculating a final AP1 balance sheet forecast, and creating final portfolio of AP1 FX contracts. The final portfolio of AP1 FX contracts may be created by executing an FX swap.

In various embodiments, the method for foreign exchange risk management has an FX results analysis. The FX results analysis may comprise calculating an FX total result. The FX total result may be the difference between an FX remeasurement result and an FX contracts result. In some embodiments, the FX results analysis may comprise obtaining final business entity data, obtaining a final FX contract and FX rate data, and calculating the remeasurement deviation. The final business entity data may be the FX remeasurement result. The final FX contract result data may be the gain or loss from the hedging activity. The final FX rate data may be a final accounting rate for AP1 and a final accounting rate for accounting period following AP1 (AP2). A remeasurement deviation may be a difference between a check FX remeasurement result from the FX remeasurement result. The check FX remeasurement result may be the product of the final AP1 balance sheet and a percentage of an accounting rate change from AP1 to AP2.

The FX results analysis may comprise calculating a final AP1 balance sheet deviation. The final AP1 balance sheet deviation may be a difference between a check final AP1 balance sheet and the final AP1 balance sheet. The check final AP1 balance sheet may be a sum of a final AP0 actual balance sheet, a final AP1 income statement, and final AP1 accruals, plus or minus a cash settlement.

The FX results analysis may comprise calculating a FX contracts deviation. The FX contracts deviation may be a difference between a FX contracts result and a check FX contracts result. The check FX contracts result may be a product of the final portfolio of AP1 FX contracts and a percentage of the accounting rate change from AP1 to AP2.

The FX results analysis may comprise calculating a balance sheet forecast deviation impact. The balance sheet the forecast deviation impact may be a difference between the final AP1 balance sheet and a final portfolio of balance sheet FX contracts multiplied by the percentage of the accounting rate change from AP1 to AP2.

The FX results analysis may comprise calculating a forecast deviation impact sources. The forecast deviation impact sources may be calculated by measuring differences between second AP1 forecasted transactions and actual transactions for AP1.

The FX results analysis may comprise calculating trade spot impact. The trade spot impact may be calculated by summing a product of adjustment FX contracts volumes and a percentage difference between the spot rates of AP1 adjustment FX contracts and an accounting rate for AP1. In some embodiments, the FX results analysis may comprise calculating a source of the trade spot impact. The source of the trade spot impact may be a product of the difference between the final AP0 balance sheet and a final AP0 balance sheet forecast and a percent difference in an accounting rate for AP1 to a FX spot trade rate realized during the creation of a second portfolio of FX contracts.

The FX results analysis may comprise calculating a forward point impact. The forward point impact may be calculated by subtracting a market value of the unrealized forward points at the end of AP1 from a sum of a realized forward points for FX contracts that matured during AP2 and a total market value of the unrealized forward points on all the FX contracts at the end of AP2. A market value of the forward points may be calculated as a product of the percentage difference between the market value for the spot rate and a market value for the forward rate and an FX contract volume for each FX contract.

The FX results analysis may comprise calculating an unknown remeasurement booking error. The unknown remeasurement booking error may be the difference between a remeasurement deviation for AP1 and a known remeasurement deviation for AP1.

In various embodiments, an exemplary method may comprise forecasting a foreign exchange exposure for a first period of time, forecasting a foreign exchange exposure for a second period of time, the second period of time comprising a termination date of the first period of time and a termination date of the second period of time, hedging risk of the foreign exchange exposure for the second period of time, the hedging based on the forecasts of the foreign exchange exposure for the first and second periods of time, wherein the hedging is performed utilizing currency contracts with a single maturity date in a single month, retrieving information in real-time from a database of foreign currency contracts to confirm that the risk based on the forecast of the foreign exchange exposure for the second period of time has been hedged, monitoring changes in foreign exchange exposure that alter the forecast of the foreign exchange exposure for the second period of time, hedging changes in foreign exchange exposure that result from changes in the forecast of the foreign exchange exposure for the second period of time, wherein the hedging is performed utilizing currency contracts with the single maturity date in the single month, and displaying a comparison of results of hedging with results of accounting from enterprise resource planning (ERP) system.

Forecasting the foreign exchange exposure for the first period of time may comprise receiving assets and liabilities reflected in a balance sheet for a first date, the assets and liabilities being expressed in a foreign currency, and forecasting the foreign exchange exposure for the first period of time based on the assets and liabilities.

Forecasting the foreign exchange exposure for the first period of time may further comprise receiving revenue and expenses forecasts from an income statement forecast for the remainder of the first period of time, the revenue and expenses forecasts being expressed in the foreign currency and adjusting the forecast of the foreign exchange exposure for the first period of time based on the revenue and expenses forecasts.

The forecasting the foreign exchange exposure for the second period of time may comprise receiving non-functional currency needs for the second period of time and adjusting the forecast for the foreign exchange exposure for the second period of time based on the non-functional currency needs. Further, the method may comprise adjusting the currency contracts with the single maturity date in the single month, the adjusting being based on the non-functional currency needs for the second period of time The method may further comprise receiving a forecast for a remainder of the first period of time and adjusting the forecast of the foreign exchange exposure for the first period of time based on the accruals forecast.

In some embodiments, forecasting the foreign exchange exposure for the second period of time comprises forecasting the foreign exchange exposure for the second period of time based on assets and liabilities for the first period of time. Forecasting the foreign exchange exposure for the second period of time may further comprise receiving revenue and expenses forecasts reflected in an income statement forecast for the second period of time, the revenue and expenses forecasts being expressed in the foreign currency and adjusting the forecast of the foreign exchange exposure for the second period of time based on the revenue and expenses forecasts.

The exemplary method may further comprise receiving accruals forecasts for the second period of time and adjusting the forecast of the foreign exchange exposure for the second period of time based on the accruals forecast.

An exemplary system comprises a balance sheet forecast calculation module, an FX contract retrieval module, and a display. The balance sheet forecast module may be configured to forecast a foreign exchange exposure for a first period of time, forecast a foreign exchange exposure for a second period of time, the second period of time comprising a termination date of the first period of time and a termination date of the second period of time, hedge risk of the foreign exchange exposure for the second period of time, the hedge being based on the forecasts of the foreign exchange exposure for the first and second periods of time, wherein the hedging is performed utilizing currency contracts with a single maturity date in a single month, hedge changes in foreign exchange exposure that result from changes in the forecast of the foreign exchange exposure for the second period of time, wherein the hedge is performed utilizing currency contracts with the single maturity date in the single month.

The FX contract retrieval module may be configured to retrieve information in real-time from a database of foreign currency contracts to confirm that the risk based on the forecast of the foreign exchange exposure for the second period of time has been hedged.

The display may be configured to display a comparison of results of hedging with results of accounting from enterprise resource planning (ERP) system.

An exemplary non-transitory computer readable medium may comprise instructions executable by a processor to perforin a method. The method may comprise forecasting a foreign exchange exposure for a first period of time, forecasting a foreign exchange exposure for a second period of time, the second period of time comprising a termination date of the first period of time and a termination date of the second period of time, hedging risk of the foreign exchange exposure for the second period of time, the hedging based on the forecasts of the foreign exchange exposure for the first and second periods of time, wherein the hedging is performed utilizing currency contracts with a single maturity date in a single month, retrieving information in real-time from a database of foreign currency contracts to confirm that the risk based on the forecast of the foreign exchange exposure for the second period of time has been hedged, monitoring changes in foreign exchange exposure that alter the forecast of the foreign exchange exposure for the second period of time, hedging changes in foreign exchange exposure that result from changes in the forecast of the foreign exchange exposure for the second period of time, wherein the hedging is performed utilizing currency contracts with the single maturity date in the single month, and displaying a comparison of results of hedging with results of accounting from enterprise resource planning (ERP) system.

With those and other objects, advantages and features that may become hereinafter apparent, the nature of the disclosure may be more clearly understood by reference to the following detailed description, the appended claims, and the drawings attached hereto.

BRIEF DESCRIPTION OF THE DRAWINGS

The accompanying drawings, which are incorporated herein and form part of the specification, illustrate various embodiments and together with the description, further serve to explain the principles and to enable a person skilled in the pertinent art to make and use the invention(s). In the drawings, like reference numbers indicate identical or functionally similar elements. A more complete appreciation of the disclosure and many of the attendant advantages thereof will be readily obtained as the same becomes better understood by reference to the following detailed description when considered in connection with the accompanying drawings.

DETAILED DESCRIPTION

By "balance sheet FX contracts" is meant an amount of forward and/or futures currency contracts held by a business entity in order to hedge risk caused by foreign currency exposure of assets and liabilities in a balance sheet. By "income statement FX contracts" is meant the amount of forward and/or futures currency contracts held by a business entity in order to hedge risk caused by foreign currency exposure reflected in an income statement.

By "balance sheet exposure" is meant the difference between net monetary assets and balance sheet FX contracts for a given accounting period.

By "line item" is meant a parameter used to calculate balance sheet forecast or balance sheet exposure.

In various embodiments, an FX risk management system relates to, for example, without limitation, activities of decision support systems, statistical analysis, querying and reporting, online analytical processing (OLAP), forecasting, and data mining. For example, the FX risk management system may allow for a reduction in exposure and the subsequent reduction of income statement volatility that arises from remeasurement of a business entity's balance sheet by providing a more accurate balance sheet forecast which allows more precise use of FX contracts. The term business entity refers to any type of organization including nonprofit, for profit, or governmental. The exposure, for example, may be balance sheet exposure and/or income statement exposure. The FX risk management system also may allow for greater management insight and understanding of FX hedging results.

Figure 1:
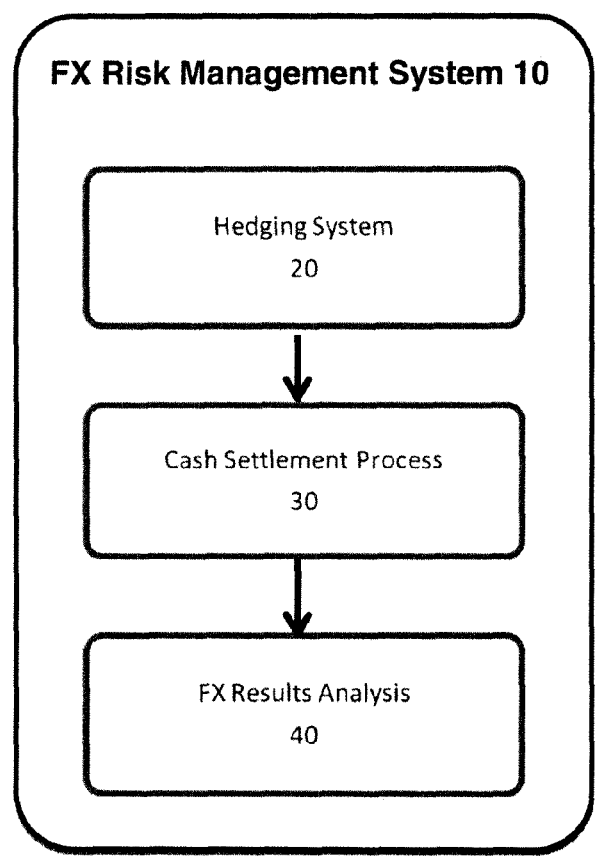
FIG. 1 is a block diagram of a foreign exchange risk management system according to an exemplary embodiment.

FIG. 1 is a block diagram of a foreign exchange risk management system (FX Risk Management System) 10 according to an exemplary embodiment. In some embodiments, the FX risk management system 10 has a hedging system 20, a cash settlement process 30, and an FX results analysis 40. A hedging system 20 is a system to hedge against risk which can occur due to any material change in a forecasted transaction (e.g., a balance sheet forecast, accrual forecast, income statement forecast, revenue forecast, cost of sales forecast, or operating expense forecast). Hedging, in some embodiments, is to take a transaction or position designed to mitigate the risk of other financial exposures. For example, a manufacturer may contract to sell a large quantity of a product for delivery over the next six months. If raw materials must be paid for in a foreign currency, the manufacturer's currency needs can be hedged by buying a foreign currency forward or an option.

The hedging system 20 may, in some embodiments, comprise obtaining business entity data, calculating balance sheet and forecast data, and trading FX contracts to hedge exposure.

Figure 2:
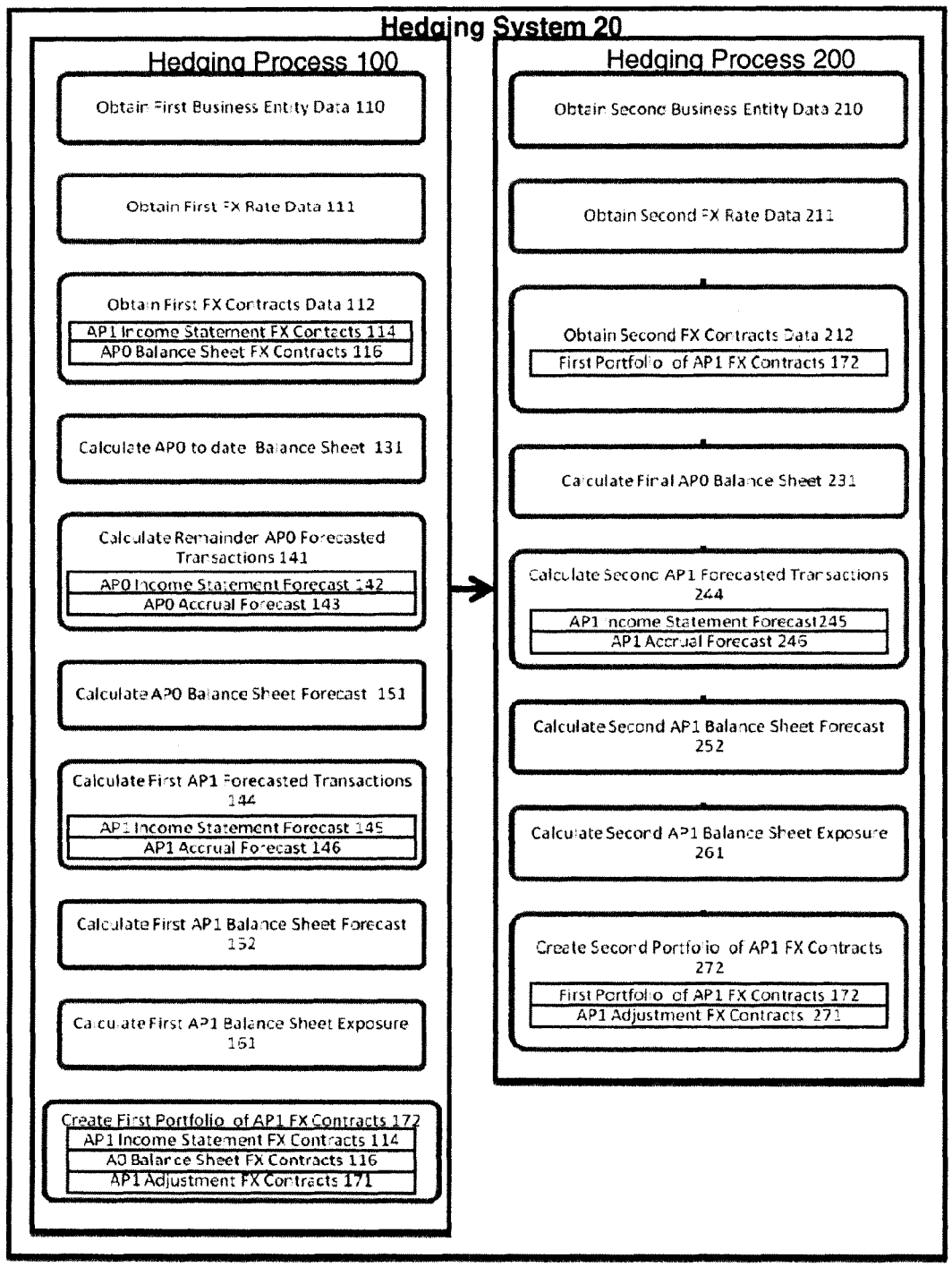
FIG. 2 is a flow diagram of a hedging system according to an exemplary embodiment.

FIG. 2 is a flow chart depicting the hedging system 20 with a first hedging process 100 and a second hedging process 200 according to an exemplary embodiment. Those skilled in the art will appreciate that the hedging system 20 may have any number of hedging processes.

In various embodiments, the first hedging process 100 occurs prior to the beginning of the AP1, the second hedging process 200 occurs after the beginning of the AP1, and the cash settlement process 30 occurs coincident to the monthly cash settlement of the corporate entity being hedged. Those skilled in the art will appreciate that a hedging process (e.g., hedging process 100 and 200) may occur at any point in time.

Figure 3:
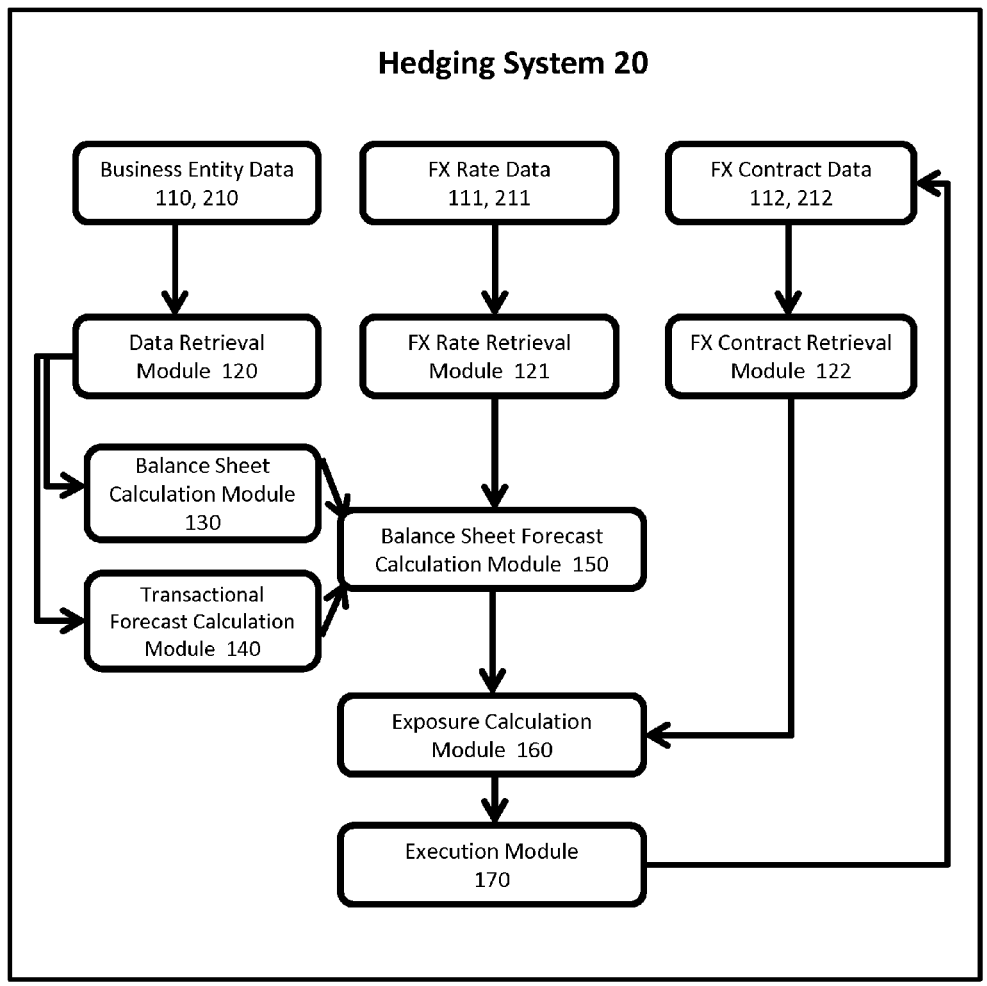
FIG. 3 is a block diagram of a hedging system according to an exemplary embodiment.

FIG. 3 is a block diagram of a hedging system 20 according to an exemplary embodiment. The hedging system will be described by referencing the flow chart of FIG. 2 as well as how the function may be carried out in the system of FIG. 3. The hedging system 20 comprises a data retrieval module 120, an FX rate retrieval module 121, an FX contracts retrieval module 122, a balance sheet calculation module 130, a transactional forecast calculation module 140, a balance sheet forecast calculation module 150, an exposure calculation module 160, and an execution module 170, or any combination thereof. Each of the foregoing components can be used independently as a software tool and/or as part of an overall system or software package. These components may interact with one another via a computing device such as a digital device. A computing device is any device with memory and a processor such as a computer, server, laptop, notebook, mobile device, smartphone, tablet, workstation, PDA, or the like.

In some embodiments, the FX risk management system 10 may contemplate two categories of FX risk: balance sheet risk and income statement risk. Balance sheet risk may represent the changing measurement of functional currency equivalents of non-functional currency account balances (e.g., assets, liabilities and owners' equity) at a given moment in time, based on official FX rates that a business entity may use. These official FX rates are known as "accounting rates" and typically change on a monthly basis depending on changing observations of these rates in the FX markets.

Income statement risk may include the value of functional currency equivalents of non-functional currency transactions (e.g., such as revenue, expenses and costs of sales) that a business entity may realize during an accounting period.

For clarity, different accounting periods will be identified chronologically. For example, the previous accounting period is identified as Accounting Period 0 (AP0). The first accounting period is identified as Accounting Period 1 (AP1). The second accounting period is identified as Accounting Period 2 (AP2). Further accounting periods may be identified in a similar fashion.

In some embodiments, the accounting rate is set by using the FX spot rate prior to the beginning of AP1. For example, the accounting rate may be set in accordance with a prevalent FX spot fixing rate provided by an FX market data provider such as WM/Reuters Ltd on the last workday of AP0. This FX spot fixing rate may be the 7 am Pacific/10 am Eastern time WM/Reuters Ltd fixing rate.

In one example, all of the income statement transactions are booked at this accounting rate and therefore no income statement FX exposure exists for the subsequent accounting period. This eliminates the need to allocate the FX hedging gains and losses to the income statement. Here, all of the FX contracts for the subsequent accounting period may be classified as balance sheet FX contracts at the start of the accounting period.

In some embodiments, the accounting rate may be set by averaging FX spot rates over an accounting period. In one example, the accounting rate may be set in accordance with an average of prevalent FX spot fixing rates provided by an FX neutral market data provider such as WM/Reuters Ltd on every workday of AP1. These FX spot fixing rates may be the 7 am Pacific/10 am Eastern time WM/Reuters Ltd fixing rates.

In this example, the FX contracts may be categorized into a set of income statement FX contracts and balance sheet FX contracts in order to split the gain and loss of the FX contracts between the balance sheet and the income statement. Here, an amount of income statement FX contracts may be categorized to balance sheet FX contracts at the FX forward rate on the date of conversion. The amount of income statement FX contracts can be categorized to balance sheet FX contracts by any suitable means, for example, without limitation, on each work day of the accounting period which totals n numbers of days, 1/n amount of income statement FX contracts are categorized to balance sheet FX contracts at the FX forward rate on the day of conversion.

For example, the income statement exposure may be hedged at the FX spot rate at the beginning of the accounting period. The calculation of the AP0 balance sheet forecast 151 can occur just prior to AP1, and the FX hedging gains and losses can be split between the income statement and balance sheet to compensate for FX impacts that each category may realize during the AP1. The income statement may be allocated FX gains and losses to hedge the exposure between the FX spot rate at the beginning of the AP1 and the accounting rate (the average FX spot rate of the AP1). The balance sheet may be allocated FX gains and losses that hedge the exposure between the changing of the accounting rates over the accounting period.

In various embodiments, the accounting rate is set by using the FX spot rate at the end of AP1. The accounting rate may be set in accordance with a prevalent FX spot fixing rate provided by an FX market data provider such as WM/Reuters Ltd on the last workday of AP1. As discussed herein, the FX spot fixing rate may be the 7 am Pacific/10 am Eastern time WM/Reuters Ltd fixing rate. Here, the FX contracts may be categorized into a separate set of income statement FX contracts in order to split the gain and loss of the FX contracts between the balance sheet and the income statement.

Here, the income statement FX contracts may be categorized to balance sheet FX contracts on the last day of the accounting period so that the FX spot rate used to categorize the contracts will be as close to the accounting rate as possible. The calculation of AP0 balance sheet forecast 151 may occur just prior to AP1 and the FX hedging gains and losses may be split between the income statement and balance sheet to compensate for FX impacts that each category may realize during AP1. The income statement may allocate FX gains and losses to hedge the exposure between the FX spot rate at the beginning of AP1 and the accounting rate (the FX spot rate at the end of AP1). The balance sheet may be allocated FX gains and losses that hedge the exposure between the changing of the accounting rates over the accounting period.

In some embodiments, the FX risk management system 10 determines at least one forecast during at least one accounting period of a forecasting cycle. While the forecasting cycle has at least one accounting period, the forecasting cycle comprises an accounting period (AP-1), a prior accounting period (AP0), a current accounting period (AP1), and future accounting period (AP2). In some embodiments, the AP1 is the period of time which is hedged. While the accounting period is any suitable time period allowing for the determination of a forecast, for clarity in this disclosure the accounting period is generally a month.

In various embodiments, the first hedging process 100 of the FX risk management system 10 obtains first business entity data 110. In one example, a computing device executes a data retrieval module 120 (see FIG. 3) which obtains the first business entity data 110. The first business entity data 110 may be general ledger data, or data that would be recorded/reported on a business entity's general ledger, including, for example, without limitation, business entity structure information, monetary general ledger account information of the business entity, and existing FX contracts.

In one example, the data retrieval module 120 obtains revenue, operational expense, cost of goods sold, asset and liability account balances at a specific period in time and over a certain date range. The data may be obtained from any data source, including, for example, without limitation, an Enterprise Resource Planning (ERP) system, an accounting system, manual process, or any combination thereof. Manual process refers to any type of document that is generated by manual input and includes accounting data. ERP refers generally to any type of enterprise system, for example, without limitation, systems available from SAP AG of Walldorf, Germany, systems available from ORACLE CORPORATION of Redwood Shores, Calif., or the like.

In some embodiments, the data retrieval module 120 retrieves business entity data (e.g., first business entity data 110) from another computing device to retrieve the data in real-time. For example, the first business entity data 110 is downloaded over the internet or intranet. Once the relevant accounts and currency codes are identified, the data retrieval module 120 may download the relevant first business entity data 110.

Those skilled in the art will appreciate that the accounting system may be intended to represent any type of accounting system or data management software.

The first hedging process 100 may obtain first FX rate data 111. In one example, the computing device executes the FX rate retrieval module 121 (see FIG. 3) which obtains the first FX rate data 111. The FX rate data may be daily FX spot rate data, FX forward rate data, and/or FX accounting rate data. The first FX rate data 111 can be entered manually, downloaded over an internal data system, for example, without limitation, a Treasury Management System (TMS), ERP system, or downloaded over the internet from market data service provider, for example, without limitation, WM/Reuters Ltd, Bloomberg of New York, or the like.

TMS refers generally to any type of enterprise system that contains FX contract information, for example, without limitation, systems available from SUNGARD of Wayne, Pa., WALL STREET SYSTEMS of New York, N.Y., or the like. The FX rate data can be used to convert and represent the business entity data from the ERP system in non-functional, functional or reporting currency amounts.

In some embodiments, the FX rate retrieval module 121 retrieves first FX rate data (e.g., the first FX rate data 111) from another computing device to retrieve the data in real-time. For example, the FX rate retrieval module 121 may retrieve the first FX rate data 111 from TMS in real-time.

The first hedging process 100 of the FX risk management system 10 may obtain the first FX contract data 112. In one example, the computing device executes the FX contract retrieval module 122 which obtains the first FX contract data 112. The first FX contract data 112 may be any FX contract, for example, without limitation, AP1 income statement FX contracts 114, AP0 balance sheet FX contracts 116, or the like. The first FX contract data 112 can be obtained from any FX contract information source, for example, without limitation a TMS. In some embodiments, the FX contract retrieval module 122 retrieves the first FX contract data 112 from another computing device (e.g., via a network) in real-time (e.g., from the TMS).

The first hedging process 100 of the FX risk management system 10 may calculate the AP0 to date balance sheet 131. The AP0 to date balance sheet 131 is the net monetary assets or the asset and liability balances of the non-functional currency that has been booked into the accounting system at the point in time the AP0 to date balance sheet 131 is calculated.

In one example, the computing device executes the balance sheet calculation module 130 which calculates the AP0 to date balance sheet 131 by subtracting the value of the monetary liabilities accounts of the accounting period to date from the value of the monetary assets accounts of the accounting period to date. In some embodiments, the monetary assets and monetary liabilities are the accounts which are set to remeasure in an entity's accounting system at the point in time when the value of the AP0 to date balance sheet 131 is recalculated based on changing accounting rates. The most recent net monetary assets value may be used to calculate the AP0 to date balance sheet 131, thereby allowing for an accurate value of the AP0 to date balance sheet 131. While the value of the AP0 to date balance sheet 131 at any suitable point in time are contemplated, the value of the AP0 to date balance sheet 131 may be used at a point in time as close to the end of the accounting period as possible.

The first hedging process 100 of the FX risk management system 10 calculates the remainder AP0 forecasted transactions 141. In one embodiment, the computing device executes the transactional forecast module 140 (see FIG. 3) which calculates the remainder AP0 forecasted transactions 141. The remainder AP0 forecasted transactions 141 may be the forecast of revenue, expenses, cost of sales and/or accruals related to non-functional cash balances that may occur between the time the AP0 to date balance sheet 131 is calculated and the end of the AP0. The transactional forecast module 140 may use statistical techniques to incorporate the data of the prior accounting periods or intra-accounting periods into the forecast, (depending on the relevance of the sets of data to the business transactions being forecasted).

The remainder AP0 forecasted transactions 141 may comprise the sum of the remainder AP0 income statement forecast 142 and/or the remainder AP0 accrual forecast 143. The remainder AP0 income statement forecast 142 may comprise the combination of the remainder AP0 revenue forecast, the remainder AP0 operating expense forecast, and/or the remainder AP0 cost of goods sold forecast.

The remainder AP0 revenue forecast may be an estimation of future sales for the remainder period of time during the AP0. The remainder AP0 revenue forecast may be calculated by a combination of historical transaction information and/or management input. The remainder AP0 operating expense forecast is an estimation of future operating expenses for the remainder period of time during the AP0. The remainder AP0 operating expense forecast may be calculated by a combination of historical transaction information and management input.

The remainder AP0 cost of goods sold forecast may be an estimation of future costs of goods sold for the remainder period of time during the AP0. The remainder AP0 cost of goods sold forecast may be calculated by the reference to the remainder AP0 revenue forecast.

The remainder AP0 accrual forecast 143 is an estimation of future accruals for the remaining period of time during the AP0. The remainder AP0 accrual forecast 143 may be calculated by a combination of historical transaction information and management input.

The first hedging process 100 of the FX risk management system 10 may determine the AP0 balance sheet forecast 151. The AP0 balance sheet forecast 151 may be a forecast of net monetary assets of a non-functional currency at the end of the AP0. In one example, the computing device executes the forecast calculation module 150 which determines the AP0 balance sheet forecast 151 by summing the AP0 to date balance sheet 131 plus the remainder AP0 forecasted transactions 141. Those skilled in the art will appreciate that any suitable data can be used to derive the AP0 balance sheet forecast 151. In one example, the AP0 balance sheet forecast 151 may be derived from the combination of the AP-1 actual balance sheet data and the AP0 forecasted transactions.

The first hedging process 100 of the FX risk management system 10 may calculate the first AP1 forecasted transactions 144. In one example, the computing device executes the transactional forecast module 140 which calculates the first AP1 transactional forecast 144. The first AP1 transactional forecast 144 is the forecast of revenue, expenses, cost of sales and accruals related to non-functional cash balances that will occur during AP1.

The first AP1 transactional forecast 144 may be the sum of the first AP1 income statement forecast 145 and the first AP1 accrual forecast 146. The first AP1 income statement forecast 145 is a forecast of future income during AP1. The first AP1 income statement forecast 145 may be the combination of the first AP1 revenue forecast, the first AP1 operating expense forecast, and/or the first AP1 cost of goods sold forecast. The first AP1 revenue forecast may be an estimation of future sales during the AP1. In some embodiments, the first AP1 revenue forecast may be calculated by a combination of historical transaction information and/or management input.

The first AP1 operating expense forecast may be an estimation of future operating expenses during the AP1. In one example, the first AP1 operating expense forecast is calculated by a combination of historical transaction information and management input. The first AP1 cost of goods sold forecast may be an estimation of future costs of goods sold during the AP1. In one example, the first AP1 cost of goods sold forecast is calculated by a function of AP1 revenue forecast and management input.

In some embodiments, the first AP1 income statement forecast 145 may be calculated by averaging income statement values over a desired number of previous accounting periods. In one example, the first AP1 income statement forecast 145 is calculated by determining the income statement value at 12 months and 3 months prior to AP1, thereby allowing for seasonal and intra-quarter fluctuations in income statement values.

Those skilled in the art will appreciate that any suitable means of calculating the first AP1 income statement forecast 145 may be contemplated. For example, the first AP1 income statement forecast 145 may be calculated by using the income statement values of a prior time period or the income statement values of a plurality of prior time periods. The time period can be any month, quarter, season, the like, or any combinations thereof, thereby allowing for fluctuations of a specific period of time during a year. This may require data of income statement values loaded into software and may be entered as any particular currency.

The first AP1 accrual forecast 146 may be an estimation of future accruals during the AP1. In some embodiments, the first AP1 accrual forecast 146 may be calculated by a combination of historical transaction information and management input. Those skilled in the art will appreciate that any suitable means of calculating the accrual forecast are contemplated. For example, the accrual forecast may be calculated by averaging previous deferred revenue and/or expenses over a desired period of time thereby allowing for fluctuations of a specific period of time during a year.

The first hedging process 100 of the FX risk management system 10 may calculate the first AP1 balance sheet forecast 152. In one example, the computing device executes the balance sheet forecast calculation module 150 which calculates the first AP1 balance sheet forecast 152. The first AP1 balance sheet forecast 152 may be, for example, the sum of the AP0 balance sheet forecast 151 and the first AP1 forecasted transactions 144. The first AP1 balance sheet forecast 152 may be calculated at the end of the AP0 and prior to the beginning of the AP1.

The first hedging process 100 of the FX risk management system 10 may determine the first AP1 balance sheet exposure 161. In one example, the computing device executes the exposure calculation module 160 which calculates the first AP1 balance sheet exposure 161. The first AP1 balance sheet exposure 161 may be the first AP1 balance sheet forecast 152 less the existing AP0 balance sheet FX contracts 116 and the existing AP1 income statement FX contracts 114. The existing AP0 balance sheet FX contracts 116 are the balance sheet FX contracts that have been booked prior to the AP1. The existing AP1 income statement FX contracts 114 are the income statement FX contracts that will mature during the AP1 and that have been booked prior to the AP1. These AP1 income statement FX contracts 114 may have been booked many months in advance of AP1. The first AP1 balance sheet exposure 161 may be calculated at the end of the AP0 and prior to the beginning of the AP1.

The first hedging process 100 of the FX risk management system 10 may calculate the value of the first adjustment balance sheet FX contracts 171 and executes the first adjustment balance sheet FX contracts 171 for hedging the first AP1 balance sheet exposure 161. In one example, the first adjustment balance sheet FX contracts 171 are FX forward/futures contracts in an amount equal and opposite to the first balance sheet FX exposure. The exposure calculation module 160 may calculate the value of the first adjustment balance sheet FX contracts 171 and the execution module 170 may execute the first adjustment balance sheet FX contracts 171.

The execution module 170 may comprise an execution algorithm embodied in the execution module 170 that determines the hedge actions to execute. The execution algorithm may contain a business entity's parameters or rules that guide the execution module 170 to execute hedge actions, including, for example, without limitation, the execution of the first adjustment balance sheet FX contracts 171 based on a negotiated spread to a spot or forward fixing rate that is provided by a neutral market data film in real-time. Examples of neutral market data firms include, for example, without limitation, WM/Reuters or the CME Group on a particular time of day and on a particular day of the month.

This spot fixing amount may also be used to set the firms accounting rate. In one example, the execution module 170 determines the currency actions to be recommended to the business entity, for example, without limitation, the number of first adjustment balance sheet FX contracts 171 to buy or sell based on the calculated first AP1 balance sheet exposure 161. Those skilled in the art will appreciate that the execution module 170 may provide a plurality of possible currency actions to the business entity.

In some embodiments, the FX risk management system 10 calculates a positive first AP1 balance sheet exposure 161. In one example, the computing device executes the exposure calculation module 160 which calculates the number of first adjustment balance sheet FX contracts 171 to sell. In some embodiments, the exposure calculation module 160 calculates the number of first adjustment balance sheet FX contracts 171 to sell by subtracting the sum of the existing AP0 balance sheet FX contracts 116 and the existing AP1 income statement FX contracts 114 from the amount of the positive first AP1 balance sheet forecast 152.

The computing device may execute the execution module 170 which performs the external trades equal to the first adjustment balance sheet FX contracts 171. The execution module 170 may categorize the first adjustment balance sheet FX contracts 171, the existing AP0 balance sheet FX contracts 116, and/or existing AP1 income statement FX contracts 114 as the first portfolio of AP1 balance sheet FX contracts 172.

In some embodiments, where the FX risk management system 10 has calculated a negative first AP1 balance sheet exposure 161, the computing device executes the exposure calculation module 160 which calculates the number of the first adjustment balance sheet FX contracts 171 to buy. In one example, the exposure calculation module 160 calculates the number of the first adjustment balance sheet FX contracts 171 to buy by subtracting the sum of the existing AP0 balance sheet FX contracts 116 and the existing AP1 income statement FX contracts 114 from the amount of the positive first AP1 balance sheet forecast 152. The computing device may execute the execution module 170 to perform the external trades equal to the first adjustment balance sheet FX contracts 171. The execution module 170 may categorize the first adjustment balance sheet FX contracts 171, existing AP0 balance sheet FX contracts 116, and/or existing AP1 income statement FX contracts 114 as the first portfolio of AP1 balance sheet FX contracts 172.

The buying and selling of FX contracts may occur in the open market by transacting with an external bank, a listed futures market, other counterparty, or the like. The external bank transactions may be executed on the last day of the AP0 and at the exact time where the market FX spot rate is as close as possible to the accounting rate for AP1. The transacted FX spot or forward rate may be based on a negotiated spread to a spot fixing rate provided by a market neutral data firm such as WM/Reuters Ltd or a forward fixing rate provided by the CME. A preferable time of day for this transaction may be 7 am Pacific/10 am Eastern time. The maturity of the balance sheet FX contracts may be for a single day in each month which corresponds to the day the entity uses for the internal transfer of cash between business entities. In some embodiments, this day is the third Wednesday of each month so that the cash transfer day corresponds with the listed futures contract delivery at the Chicago Mercantile Exchange (CME) during a month where that contract is available. While maturities for balance sheet FX contracts may span several months, maturities may have a single date for maturity within any given month.

Those skilled in the art will appreciate that FX contracts may be bought and sold in real-time. For example, the hedging process 100 and/or 200 may identify risk using real-time information from sources available over a network and determine an action to be taken immediately. In some embodiments, the hedging system 20 may purchase and/or sell one or more FX contracts pursuant to the determination automatically and in real-time. In some embodiments, the hedging system 20 may make a determination of an action to be taken and provide one or more recommendations. In one example, the recommendation may be for a FX contract with specific or general terms (e.g., currency, duration of contract, amount, and/or price of contract).

The second hedging process 200 of the FX risk management system 10 may obtain second business entity data 210. In one example, the computing device executes the data retrieval module 120 which obtains the second business entity data 210. In some embodiments, the data retrieval module 120 obtains the second business entity data 210 after the creation of the first portfolio of AP1 balance sheet FX contracts 172. The second business entity data 210 may be, for example, general ledger data, or data that would be recorded/reported on a business entity's general ledger obtained after the general ledger has been finalized for the period, for example, without limitation, business entity structure information, monetary general ledger account information of the business entity, and existing FX contracts. In one example, the data is obtained from a data source, for example, without limitation, an ERP system, an accounting system, manual process, or any combination thereof. The second business entity data 210 may be downloaded over the Internet or any network. Once the relevant accounts and currency codes are identified, the data retrieval module 120 may download the relevant second business entity data 210.

The second hedging process 200 of the FX risk management system 10 may obtain the second FX rate data 211. In one example, the computing device executes the FX rate retrieval module 121 which obtains the second FX rate data 211. The FX rate data may be, for example, daily FX spot rate, FX forward rate data, and/or FX accounting rate data. The second FX rate data 211 may be entered manually or downloaded over an internal data system, for example, without limitation, a TMS or ERP system, or uploaded over the Internet or any network from a market data service provider, for example, without limitation, WM/Reuters Ltd, Bloomberg of New York, or the like. The FX rate data 211 may be used to calculate and represent the business entity data in non-functional, functional or reporting currency amounts.

The second hedging process 200 of the FX risk management system 10 may obtain the second FX contract data 212. In one example, the computing device executes the FX contract retrieval module 122 which obtains the second FX contract data 212. The second FX contract data 212 may be any FX contract including, for example, AP1 income statement FX contracts 114, the first portfolio of AP1 FX contracts 172, or the like. The second FX contract data 212 may be obtained from any FX contract information source, including for example, without limitation, a TMS.

The second hedging process 200 of the FX risk management system 10 may calculate the final AP0 balance sheet 231. The final AP0 balance sheet 231 may be the net monetary assets or the asset and liability balances of the non-functional currency booked into the accounting system at the end of the AP0. In one example, the computing device executes the balance sheet calculation module 130 which calculates the final AP0 balance sheet 231 by subtracting the value of the monetary liabilities accounts at the end of the AP0 from the value of the monetary assets accounts at the end of the AP0. The most recent monetary assets and monetary liabilities values may be used to calculate the final AP0 balance sheet 231, thereby allowing for an accurate value of the final AP0 balance sheet 231. While the value of the final AP0 balance sheet 231 at any suitable point in time is contemplated, the value of the final AP0 balance sheet 231 may be used at a point in time as close to the end of the accounting period as possible.

The second hedging process 200 of the FX risk management system 10 may calculate the second AP1 forecasted transactions 244. In one example, the computing device executes the transactional forecast module 140 which calculates the second AP1 forecasted transactions 244. The second AP1 forecasted transactions 244 may be the forecast of revenue, expenses, cost of sales and accruals related to non-functional cash balances that will occur during AP1.

In some embodiments, the second AP1 forecasted transactions 244 is the sum of the second AP1 income statement forecast 245 and the second AP1 accrual forecast 246. The second AP1 income statement forecast 245 may be a forecast of future income during AP1. The second AP1 income statement forecast may be the combination of the second AP1 revenue forecast, the second AP1 operating expense forecast, and/or the second AP1 cost of goods sold forecast.

The second AP1 revenue forecast may be an estimation of future sales during the AP1. The second AP1 revenue forecast may be calculated by a combination of historical transaction information and management input. The second AP1 operating expense forecast may be an estimation of future operating expenses during the AP1. The second AP1 operating expense forecast may be calculated by a combination of historical transaction information and management input. The second AP1 cost of goods sold forecast is an estimation of future costs of goods sold during the AP1. The second AP1 cost of goods sold forecast may be calculated by a function of second AP1 revenue forecast and management input.

In some embodiments, the second AP1 income statement forecast 245 is calculated by averaging income statement values from a desired number of previous accounting periods. In one example, the second AP1 income statement forecast 245 is calculated by determining the income statement value at 12 months and 3 months prior to the AP1, thereby allowing for seasonal and intra-quarter fluctuations in income statement values.

Those skilled in the art will appreciate that a suitable means of calculating the second AP1 income statement forecast 245 are contemplated. For example, the second AP1 income statement forecast 245 may be calculated by using the income statement values of a prior time period or the income statement values of a plurality of prior time periods. The time period can be any month, quarter, season, the like, or any combinations thereof, thereby allowing for fluctuations of a specific period of time during a year. The data of income statement values may be loaded into software and entered as any particular currency.

The second AP1 accrual forecast 246 may be an estimation of future accruals during the AP1. The second AP1 accrual forecast 246 may be calculated by a combination of historical transaction information and/or management input. Those skilled in the art will appreciate that any suitable means of calculating the second AP1 accrual forecast 246 are contemplated. For example, the second AP1 accrual forecast 246 may be calculated by averaging previous deferred revenue and/or expenses over a desired period of time thereby allowing for fluctuations of a specific period of time during a year.

The second hedging process 200 of the FX risk management system 10 may calculate the second AP1 balance sheet forecast 252. In one example, the computing device executes the balance sheet forecast calculation module 150 which calculates the second AP1 balance sheet forecast 252. The second AP1 balance sheet forecast 252 may be, for example, without limitation, the sum of the final AP0 balance sheet 231 and the second AP1 forecasted transactions 244.

The second hedging process 200 of the FX risk management system 10 may determine the second AP1 balance sheet exposure 261. The second AP1 balance sheet exposure 261 represents the balance sheet exposure at a desired point in time after the first AP1 balance sheet exposure 161 has been calculated. Adjustments that may affect the first AP1 balance sheet exposure 161 and therefore create the need for a second AP1 balance sheet exposure 261 calculation may be, for example, without limitation, deviations in the AP0 balance sheet forecast 151 as compared to the final AP0 balance sheet 231, deviations in the first AP1 income statement forecast 145 to the second AP1 income statement forecast 245, deviations in the first AP 1 accrual forecast 146 to the second AP1 accrual forecast 246, and/or accounting irregularities. While some embodiments contemplate only a single adjustment due to deviations, those skilled in the art will appreciate that any subsequent deviations of transactional forecasts over the accounting period may require hedging adjustments.

The second AP1 balance sheet exposure 261 may be calculated after the end date of the AP0 and once the final AP0 balance sheet 231 and second AP1 income statement forecast 245 are available. The exposure calculation module 160 may calculate the second AP1 balance sheet exposure 261. The second AP1 balance sheet exposure 261 may be the second AP1 balance sheet forecast 252 less the value of the first portfolio of AP1 balance sheet FX contracts 172. The second AP1 balance sheet exposure 261 may be calculated at any time after the final AP0 balance sheet 231 is obtained. In some embodiments, the second AP1 balance sheet exposure 261 is calculated and additional balance sheet FX contracts are executed immediately after the final AP0 balance sheet 231 is obtained. Calculating the second AP1 balance sheet exposure 261 after the final AP0 balance sheet 231 is obtained may mitigate movement in the market of FX spot rates from the accounting rate.

The second hedging process 200 of the FX risk management system 10 may create a second portfolio of AP1 balance sheet FX contracts 272 in order to hedge the second AP1 balance sheet exposure 261. In one example, the execution module 170 may create a second portfolio of AP1 balance sheet FX contracts 272.

In some embodiments, the second hedging process 200 of the FX risk management system 10 calculates a second AP1 balance sheet exposure 261. In one example, the computing device executes the exposure calculation module 160 which calculates the number of second adjustment balance sheet FX contracts 271 to sell. The second adjustment balance sheet FX contracts 271 may be FX forward/futures contracts in an amount equal and opposite to the second balance sheet FX exposure.

In some embodiments, the exposure calculation module 160 calculates the number of second adjustment balance sheet FX contracts 271 to sell by subtracting the amount of the first portfolio of AP1 balance sheet FX contracts 172 from the amount of the positive second AP1 balance sheet forecast 252. The computing device executes the execution module 170 which may perform the external trades equal to the second adjustment balance sheet FX contracts 271. The execution module 170 may categorize the second adjustment balance sheet FX contracts 172 and the first portfolio of AP1 balance sheet FX contracts 172 as the second portfolio of AP1 balance sheet FX contracts 272.

The second hedging process 200 of the FX risk management system 10 may calculate a negative second AP1 balance sheet exposure 261. In one example, the computing device executes the exposure calculation module 160 which calculates the number of second adjustment balance sheet FX contracts 271 to buy. The exposure calculation module 160 may calculate the number of second adjustment balance sheet FX contracts 271 to buy by subtracting the sum of the first portfolio of AP1 balance sheet FX contracts 172 from the amount of the positive second AP1 balance sheet forecast 252. In some embodiments, the computing device executes the execution module 170 which performs the external trades equal to the second adjustment balance sheet FX contracts 271. The execution module 170 may categorize the second adjustment balance sheet FX contracts 271 and the first portfolio of AP1 balance sheet FX contracts 172 as the second portfolio of AP1 balance sheet FX contracts 272.

Figure 4:
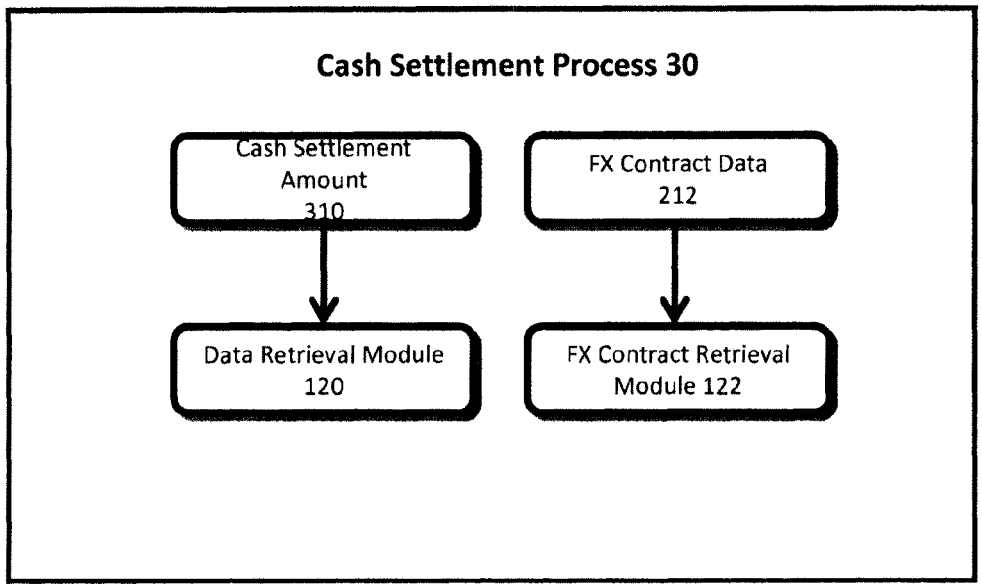
FIG. 4 is a block diagram of a cash settlement process according to an exemplary embodiment.
Figure 5:
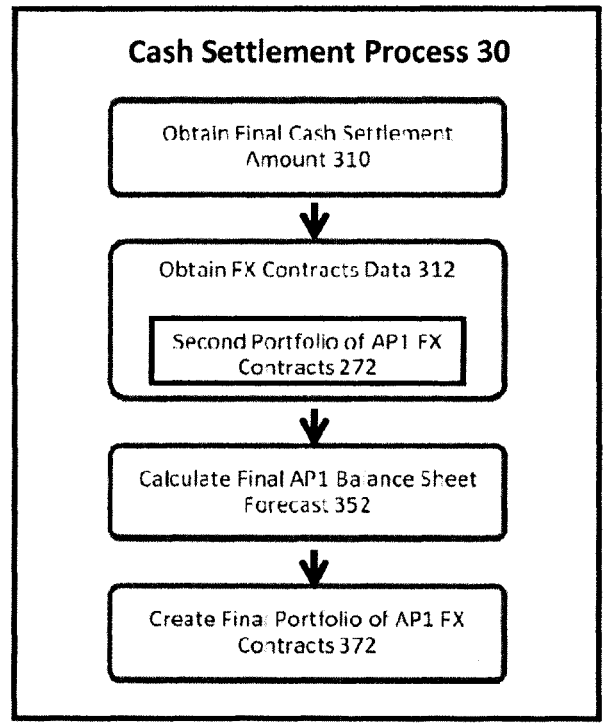
FIG. 5 is a flow diagram of a cash settlement process according to an exemplary embodiment.

FIG. 4 is a block diagram of a cash settlement process 30 according to an exemplary embodiment. FIG. 5 is a flow diagram of a cash settlement process according to an exemplary embodiment. In some embodiments, the cash settlement process 30 of the FX risk management system 10 has the step of incorporating an amount of cash settlement 310 by one or more business entities, which may affect the final AP1 balance sheet forecast 352 (see FIG. 5). In one example, the computing device executes the data retrieval module 120 which incorporates an amount of cash settlement 310.

The computing device may execute the FX contract retrieval module 122 which may incorporate the FX contract data 212. The final AP1 balance sheet forecast 352, in this example, is the balance sheet forecast at the end of the AP1 after subtracting the amount of cash settlement 310. The FX contract data 312 may be the second portfolio of AP1 FX contracts 272. The cash settlement 310 may be the amount of non-functional currency that a business entity has determined is available or needed to deliver or receive from the amount of cash received from accounts receivable and the amount of cash used for accounts payable.

In one example, the business entity may deliver or receive the cash to or from an external banking counterparty. This process may include, for example, without limitation, the delivery of cash to multiple external banking counterparties or a central internal business entity with which it has entered into legally binding intercompany balance sheet FX contracts. The amount of cash available for delivery may be determined by obtaining the data from internal accounting systems and/or a forecast of working capital requirements. The amount of cash settlement 310 that is delivered or received may be incorporated with the obligations resulting from balance sheet FX contracts previously executed that are set to mature during the AP1.

In some embodiments, where the cash settlement 310 is not equal to the value of the maturing second portfolio of AP1 balance sheet FX contracts 272, an FX swap of the unequal amount is performed, thereby creating a final portfolio of AP1 balance sheet FX contracts 372 in the future while at the same time satisfying the unequal amount of cash settlement 310 to the maturing second balance sheet FX contracts 272. Since the cash settlement 310 against the second balance sheet FX contracts 272 may affect the final AP1 balance sheet forecast 352 and also may affect the FX contract volume equally, no additional adjustment balance sheet FX hedging may be needed to account for the cash settlement 310. The effect of the cash settlement 310 on the final AP1 balance sheet forecast 352 may be a reduction or an increase.

The FX swap may be a spread transaction for the difference between the cash settlement amount 310 and the second portfolio of AP1 FX contracts. The amount of cash settlement 310 may be in the form of non-functional currency and may be converted into a functional currency. In some embodiments, the 'forward' leg of the FX swap done with an external counterparty is converted into futures contracts in a 'block' transaction and converted into an obligation of one a listed futures exchange. Those skilled in the art will appreciate that an additional hedging process as those described herein can occur after the cash settlement process 30.

In various embodiments, where a cash settlement is required prior to the maturing of second portfolio of AP1 balance sheet FX contracts 272, an FX swap of the unequal amount is performed, thereby modifying the portfolio of AP1 balance sheet FX contracts 372 while at the same time satisfying the requirement for cash settlement that is occurring prior to the maturity of AP1 balance sheet FX contracts 272. Since the cash settlement against the second balance sheet FX contracts 272 may affect the final AP1 balance sheet forecast 352 and may also affect the FX contract volume equally, no additional adjustment balance sheet FX hedging may be needed to account for the cash settlement 310. The effect of the cash settlement on the final AP1 balance sheet forecast 352 may be a reduction or an increase. The FX swap may be a spread transaction for the difference between the cash settlement amount and the second portfolio of AP1 FX contracts.

Figure 6:
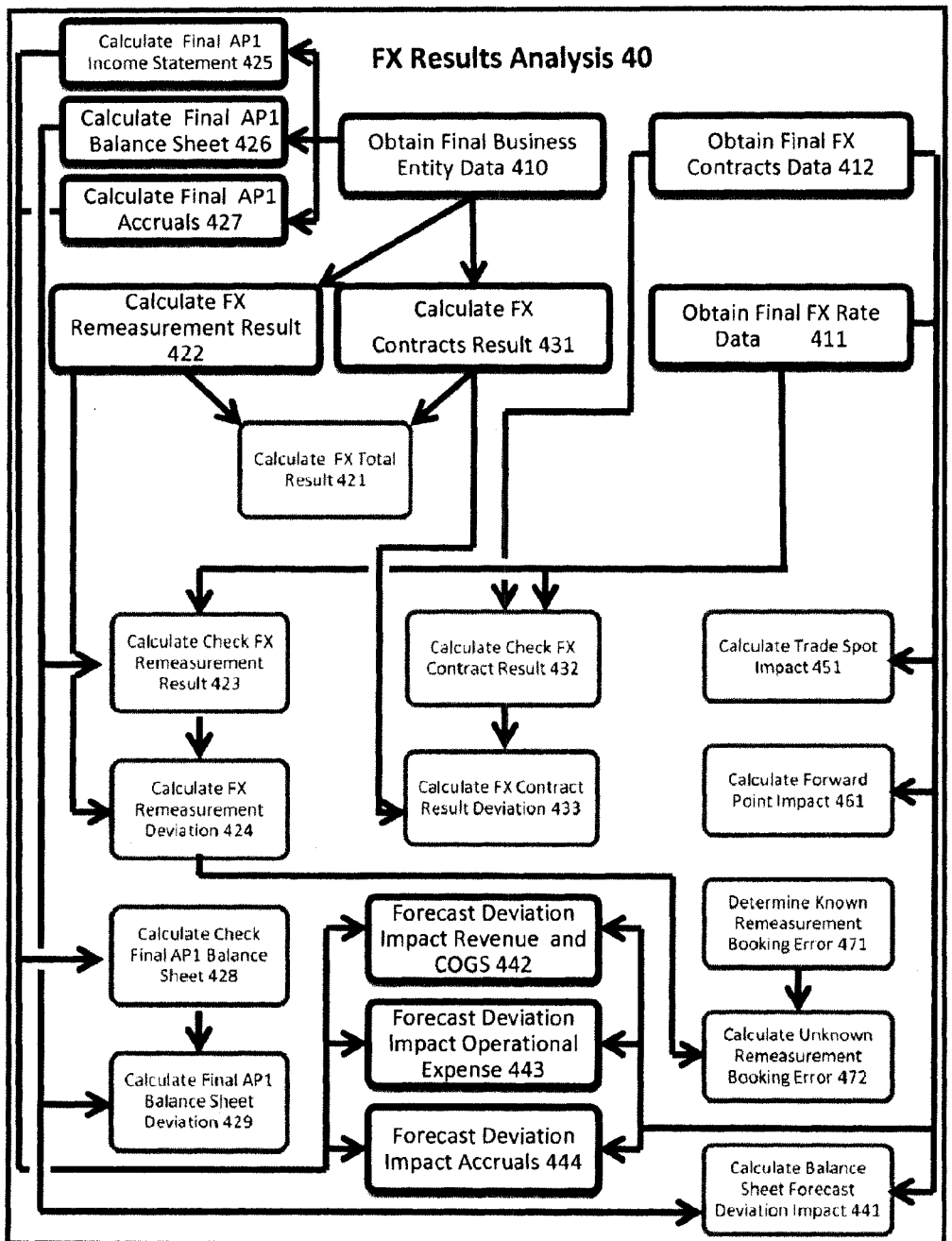
FIG. 6 is a flow diagram of a foreign exchange results analysis according to an exemplary embodiment.
Figure 7:
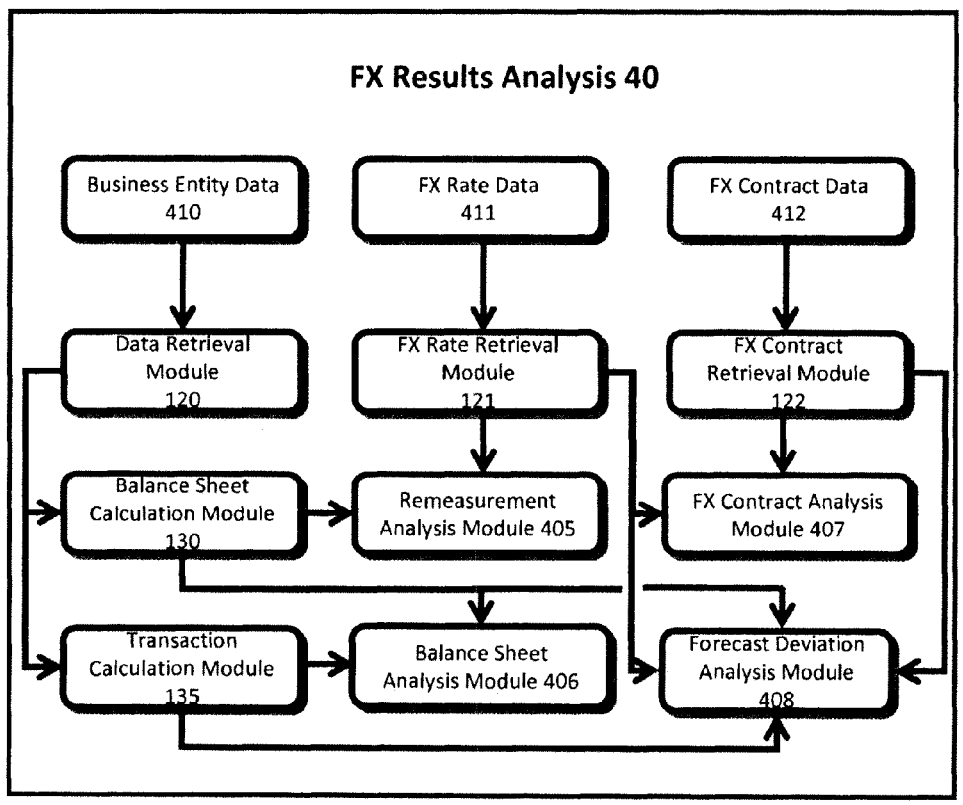
FIG. 7 is a block diagram of a foreign exchange results analysis according to an exemplary embodiment.

FIG. 6 is a flow diagram of a foreign exchange results analysis 40 according to an exemplary embodiment. In some embodiments, the FX results analysis 40 determines the factors influencing the results of hedging the balance sheet exposure. In one example, the FX results analysis 40 has the step of calculating the FX total result 421 that may demonstrate the overall effectiveness of the FX risk management system 10 for a desired accounting period. In various embodiments, a goal of the hedging process is to obtain an FX total result 421 value of zero, thereby avoiding a variance in the FX total result 421. The FX total result 421 may be calculated by determining the difference between an FX remeasurement result 422 and an FX contracts result 431. The FX remeasurement result 422 may be the income statement impact, resulting from the change in the accounting rate of the non-functional currencies as compared to the functional currency of any given business entity during an accounting period. The FX contracts result 431 may be the profit or loss generated from the balance sheet FX contracts during an accounting period that has been booked to the entity's ERP system.

The computing device may execute the data retrieval module 120 which obtains the final business entity data 410. The final business entity data 410 may be general ledger data, or data that would be recorded/reported on a business entity's general ledger found after the close of the business entities general ledger for the accounting period, for example, without limitation, business entity structure information, monetary general ledger account information of the business entity, and existing FX contract results. In some embodiments, the data is obtained from a data source, for example, without limitation, an ERP system, an accounting system, manual process, or any combination thereof. The final business entity data 410 may include the FX remeasurement result 422 and the FX contracts results 431.

Further, the computing device may execute the FX rate retrieval module 121 which obtains the final FX rate data 411. The final FX rate data 411 has, for example, without limitation, the final accounting rate for AP1 and AP2. In some embodiments, the computing device executes the FX contract retrieval module 122 to obtain the final FX contracts data 412. The final business entity data 410, final FX rate data 411, and final FX contracts data 412 may be used for any embodiment of the FX results analysis 40.

The FX results analysis 40 may determine the accuracy of the final business entity data 410 to determine if inconsistent final business entity data 410 contributed to the variance of the FX total result 421.

In some embodiments, the FX results analysis 40 has the step of determining the accuracy of the FX remeasurement result 422 by comparing the FX remeasurement result 422 to a check FX remeasurement result 423, thereby creating the remeasurement deviation 424. The FX remeasurement deviation 424 may be created by subtracting the check FX remeasurement result 423 from the FX remeasurement result 422. The FX remeasurement deviation 424 may allow the user to identify whether the variance in the FX total result 421 was due to an inaccurate remeasurement of the corporate entity's balance sheet.

In one example, the computing device executes the remeasurement analysis module 405 which creates check FX remeasurement result 423 by multiplying the final AP1 balance sheet 426 by the percentage change in the accounting rate from AP1 to the accounting rate from AP2. The computing device may execute the balance sheet calculation module 130 which calculates the final AP1 balance sheet 426 using the final business entity data 410. The final AP1 balance sheet 426 may be the net monetary assets or the asset and liability balances of the non-functional currency booked into the accounting system at the end of the AP1. The final AP1 balance sheet 426 may be calculated by subtracting the value of the monetary liabilities accounts at the end of the AP1 from the value of the monetary assets accounts at the end of the AP1.

The FX results analysis 40 may have the step of determining the accuracy of the FX remeasurement result 422 by determining the consistency of the final AP1 balance sheet 426, the final AP1 income statement 425, and the final AP1 accruals 427 by comparing the final AP1 balance sheet 426 to a check final AP1 balance sheet 428, thereby creating the final AP1 balance sheet deviation 429. The final AP1 balance sheet deviation 429 may be calculated by subtracting the check final AP1 balance sheet 428 from the final AP1 balance sheet 426. In some embodiments, the AP1 balance sheet deviation 429 allows the user to identify whether the final AP1 balance sheet 426 is consistent with the final AP1 income statement 425 and final AP1 accruals 427. The check final AP1 balance sheet 428 may be calculated by summing the final AP1 actual balance sheet 231, the values of the final AP1 income statement 425 and final AP1 accruals 427, and subtracting or adding the cash settlement 310.

In one example, the computing device executes the transaction calculation module 135 which calculates the final AP1 income statement 425 by summing the revenue and subtracting the operational expenses, and cost of goods sold for the non-functional currency at the end of the AP1. The transactional calculation module 135 may calculate the final AP1 accruals 427 which may be general ledger entries that affect the non-functional currency final AP1 balance sheet 426 balances that do not pass through the income statement. The computing device may execute the balance sheet analysis module 406 which calculates the check final AP1 balance sheet 428. Deviations, if any, may be due to having incorrect currency codes entered for either the balance sheet or income statement or having the business entity price with one currency yet decide to bill with another.

In some embodiments, the FX results analysis 40 may have the step of determining the accuracy of the FX contracts result 431 by comparing the FX contracts result 431 to a check FX contracts result 432, thereby creating the FX contracts deviation 433. In one example, the computing device executes the FX contract analysis module 407 which creates the FX contracts deviation 433 by subtracting the FX contracts result 431 from the check FX contracts result 432. The FX contracts deviation 433 allows the user to identify whether the variance in the FX total result 421 was due to an inaccurate calculation of the FX contracts gain or loss by the accounting or TMS, thereby allowing the entity to focus its investigation into the cause of the FX contracts deviation 433. The check FX contracts result 432 may be calculated by multiplying the final portfolio of AP1 FX contracts and the percentage of the accounting rate change from AP1 to AP2.

The FX results analysis 40 may quantify the impact of the components of the hedging process that affected the FX total result 421. The FX results analysis 40 may evaluate the accuracy of the balance sheet forecasting and subsequent forecast deviation impact, the impact of trade FX spot rates, the impact of forward points, and the impact of remeasurement deviation, or any combination thereof.

The FX results analysis 40 may have the step of calculating the balance sheet forecast deviation impact 441 of the balance sheet forecasting process and the resulting effect on the FX total result 421. In some embodiments, the computing device executes the forecast deviation analysis module 408 which calculates the balance sheet forecast deviation impact 441. The balance sheet forecast deviation impact 441 allows the user to identify the portion of the variance in the total result 421 that was due to an inaccurate forecast of the AP1 balance sheet exposure. The balance sheet forecast deviation is the difference between the final AP1 balance sheet 426 and the final portfolio of balance sheet FX contracts 372. The balance sheet forecast deviation impact 441 may be the difference between the final AP1 balance sheet and the final portfolio of balance sheet FX contracts multiplied by the percentage change in the accounting rate for AP1 to AP2.

The FX results analysis 40 may have the step of determining the forecast deviation impact sources. The forecast deviation impact sources may be calculated by measuring the differences between the second AP1 forecasted transactions and the actual transactions for AP1. In one example, the computing device executes the forecast deviation analysis module 408 which calculates the forecast deviation impact sources by performing a forecast deviation analysis. The forecast deviation analysis may involve comparing the second AP1 forecasted transactions 244 to the final AP1 actual transactions. The final AP1 actual transactions may be reflected in the final AP1 income statement 425 and final AP1 accruals 427. Forecast deviation impact sources may be forecast deviation impact revenue and cost of sales (COGS) 442, forecast deviation impact operational expense 443, and forecast deviation impact accruals 444. The forecast deviation impact sources may further refine the sources of the balance sheet forecast deviation impact 441 allowing an entity to concentrate its efforts on forecasting areas that are most problematic as well as allocate the balance sheet hedging gains and losses to the entities that were responsible for the balance sheet forecast deviation impact 441.

In some embodiments, the FX results analysis 40 has the step of calculating the trade spot impact 451. In one example, the computing device executes the FX contract analysis module 407 which calculates the trade spot impact 451 by summing the product of the adjustment FX contracts volumes and the percentage difference between the spot rates of the AP1 adjustment FX contracts and the accounting rate for AP1 The trade spot impact 451 allows the user to identify the proportion of the variance in the total result 421 that was due to a variance in the FX spot rate as compared to the accounting rate, thereby allowing the entity to further focus its investigation into sources of variance in the FX total result 421. The trade spot impact 451 may be the impact of executing the balance sheet FX adjustment contracts at a FX spot rate that is not equal to the accounting rate.

A balance sheet FX adjustment contract may be those FX contracts traded to create, for example, without limitation, the first portfolio of AP1 balance sheet FX contracts 172, the second portfolio of AP1 balance sheet FX contracts 272, the third portfolio of AP1 balance sheet FX contract 372, or any other FX contract traded during the accounting period. The trade spot impact 451 may be any impact resulting from a trade of an FX contract adjustment during an accounting period, for example, without limitation, a first trade spot impact 451 resulting from the first trade spot FX rate and a second trade spot impact 451 resulting from the second trade spot FX rate. While the first trade spot impact 451 for the first AP1 adjustment FX contracts 171 may be a measure of how well the currency trader executed the contract as compared to the accounting rate, the second trade spot impact 451 for the second AP1 adjustment FX contracts 271 may be the result of final AP0 balance sheet 231 not being equal to the AP0 balance sheet forecast 151, the result of incorporating adjustments from the first AP1 transactional forecast 144 to the second AP1 transactional forecast 244.

The FX results analysis 40 may have the step of determining the sources of the trade spot impact 451 for the second AP1 adjustment FX contracts 271. The sources of the trade spot impact 451 for the second AP1 adjustment FX contracts 271 may be calculated by individually determining the AP0 balance sheet forecast deviation and the first to second AP1 forecast transaction deviation. The AP0 balance sheet forecast deviation may be the difference between the final AP0 balance sheet 231 and the final AP0 balance sheet forecast 151. The first to second AP1 forecast transaction deviation may be the difference between the first AP1 forecast transactions 144 and the second AP1 forecast transactions 244. The sources of trade spot impact 451 for the second AP1 adjustment FX contracts 271 are derived by individually multiplying the AP0 balance sheet forecast deviation and the first to second AP1 forecast transaction deviation by the percent difference in the accounting rate AP1 and the FX spot trade rate on the second AP1 adjustment FX contracts 271.

The FX results analysis 40 may include the step of calculating the forward point impact 461 on the overall profitability of the FX contracts in a manner that is not offset by the FX remeasurement results. In one example, the computing device executes the FX contract analysis module 407 which calculates the forward point impact 461. The forward point impact 461 may be calculated by subtracting the market value of the unrealized forward points at the end of AP1 from the sum of the realized forward points for FX contracts that matured during AP2 and the total market value of the unrealized forward points on all the FX contracts at the end of AP2. The market value of the forward points may be calculated as the product of the percentage difference between the market value for the spot rate and the market value for the forward rate and the FX contract volume for each FX contract.

The forward point impact 461 may allow the user to identify whether the variance in the total result 421 was due to forward point values thereby allowing the entity to focus its investigation into the cause of the variance in the total result 421 due to forward point values. The forward point impact 461 may be the impact the forward points have on the FX contract results 431. Deviations in the FX total result results 411 due to the forward points may occur when the interest rates of two currencies contemplated in the FX contract differ.

The FX results analysis 40 may include the step of determining the remeasurement booking error 471. In one example, the computing device executes the remeasurement analysis module 405 which categorizes the remeasurement booking error 471. The remeasurement booking error 471 allows the user to identify the amount of variance of the total result 421 that is attributed to a booking manually entered into the remeasurement profit and loss account in order to fix a previously incorrect account booking. In one example, the unknown remeasurement booking error 472 is calculated by subtracting the known remeasurement booking error 471 from the FX remeasurement deviation 424. The unknown remeasurement booking error 472 may be the portion of the FX remeasurement deviation 424 where the source of deviation for said portion is unknown. In one aspect, the known remeasurement deviation for AP1 may be calculated by summing the remeasurement deviation that has been previously identified as booking errors in the FX results analysis of AP0 and is being corrected during AP1 remeasurement process. Further analysis may be required for the unknown portion of the remeasurement deviation 424.

In some embodiments, it is contemplated that some or all of the steps described herein may be implemented within, or using, software modules (programs) that are executed by one or more general purpose computers. In these embodiments, the software modules may be stored on or within any suitable computer-readable medium. It should be understood that the various steps may alternatively be implemented in-whole or in-part within specially designed hardware.

In one embodiment, the systems and methods for providing business intelligence may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, Lua, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the computing device communicates with one or more databases that store information, for example, without limitation, business entity data, foreign exchange rate data, or the like. This database or databases may be implemented using any summary level repositories, such as summary level tables, OLAP cubes, or the like, as well as other types of databases such as, for example, without limitation, relational database, a flat file database, a business entity-relationship database, and object-oriented database, and/or a record-based database. While a technology platform is preferably OLAP, the technology platform can be MOLAP, HOLAP, ROLAP, or JOLAP, Extract Transform Load (ETL), Enterprise Application Interfaces (EAI), Enterprise Information Interfaces (EII), and operating systems, and networks.

Where the computing device communicates with OLAP cubes, the FX risk management system 10 contemplates a plurality of database dimensions. The FX risk management system 10 contemplates, in some embodiments, four database dimensions, for example, without limitation, time, business entity, currency, and line item. The time dimension is the different Accounting Periods for a business entity, the business entity dimension is the different subsidiaries of a business entity, the currency dimension is the different number of currencies that a business entity may incur transactions in, and the line item dimension contains forecasted balances for a business entity's income statement, balance sheet FX contract volumes, and algorithms that pertain to the combination of these items. This allows a business entity to analyze financial data by time, business entity, currency, or line items. In one embodiment, the parameter of each database dimension can vary within a database dimension, for example, without limitation, where the database dimension is time, the database dimension can have different time values, for example, without limitation, a day, month, quarter, year, or the like. In one embodiment, each module of the FX risk management system 10 can have a different number of database dimensions, for example, without limitation, the FX rate retrieval module 121 has three database dimensions, currency, rate type, and time. Here, the time dimension represents different days in the Accounting Period and the rate type represents the different type of rates being contemplated for example, without limitation, spot FX rates, forward FX rates, and accounting rates.

In one embodiment, the computing device is IBM, Macintosh, or Linux/Unix compatible. In another embodiment, the computing device comprises a server, a laptop computer, a cell phone, a personal digital assistant, a kiosk, or an audio player, for example. In one embodiment, the computing device includes but is not limited to one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface ("GUI"), among other things.

The computing device may include one or more commonly available input/output (I/O) devices and interfaces, such as a keyboard, mouse, touchpad, microphone, and printer. Thus, in one embodiment the computing device may be controlled using the keyboard and mouse input devices, while in another embodiment the user may provide voice commands to the computing device via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In one embodiment, the I/O devices and interfaces provide a communication interface to various external devices. For example, the computing device may be configured to communicate with one or more networks, such as any combination of one or more LANs, WANs, a virtual private network (VPN), or the Internet, for example, via a wired, wireless, or combination of wired and wireless, communication links. The network communicates with various computing devices and/or other electronic devices via wired or wireless communication links.

Figure 8:
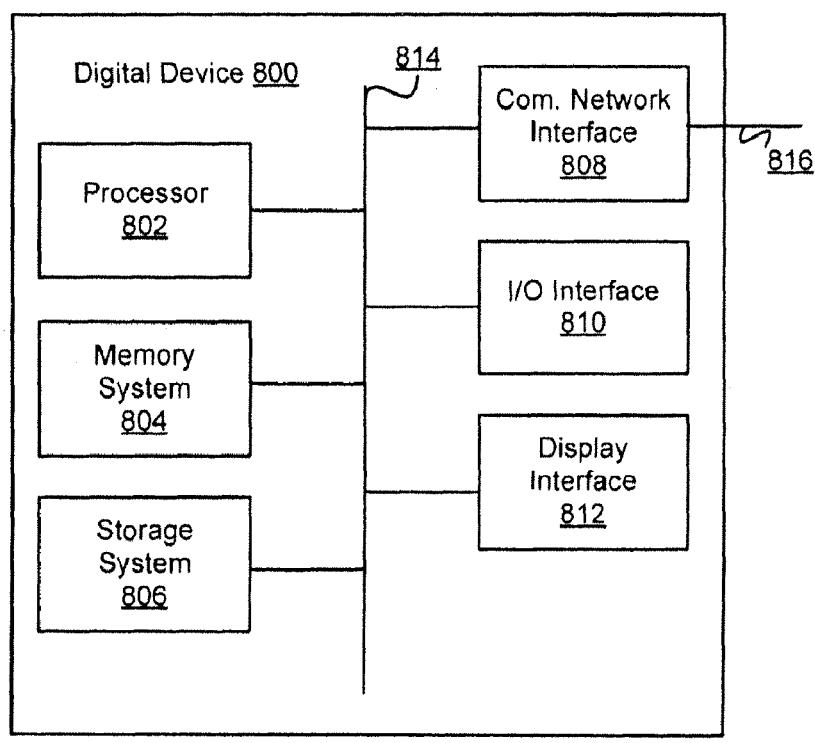
FIG. 8 is a block diagram of a digital device in an exemplary embodiment.

FIG. 8 is a block diagram of an exemplary digital device 800. The digital device 800 comprises a processor 802, a memory system 804, a storage system 806, a communication network interface 808, an I/O interface 810, and a display interface 812 communicatively coupled to a bus 814. The processor 802 is configured to execute executable instructions (e.g., programs). In some embodiments, the processor 802 comprises circuitry or any processor capable of processing the executable instructions.

The memory system 804 is any memory configured to store data. Some examples of the memory system 804 are storage devices, such as RAM or ROM. The memory system 804 can comprise the ram cache. In various embodiments, data is stored within the memory system 804. The data within the memory system 804 may be cleared or ultimately transferred to the storage system 806.

The storage system 806 is any non-transitory storage configured to retrieve and store data. Some examples of the storage system 806 are flash drives, hard drives, optical drives, and/or magnetic tape. In some embodiments, the digital device 800 includes a memory system 804 in the form of RAM and a storage system 806 in the form of flash data. Both the memory system 804 and the storage system 806 comprise computer readable media which may store instructions or programs that are executable by a computer processor including the processor 802.

The communication network interface (com. network interface) 808 can be coupled to a network (e.g., communication network 114) via the link 816. The communication network interface 808 may support communication over an Ethernet connection, a serial connection, a parallel connection, or an ATA connection, for example. The communication network interface 808 may also support wireless communication (e.g., 802.11 a/b/g/n, WiMax). It will be apparent to those skilled in the art that the communication network interface 808 can support many wired and wireless standards.

The optional input/output (I/O) interface 810 is any device that receives input from the user and output data. The optional display interface 812 is any device that is configured to output graphics and data to a display. In one example, the display interface 812 is a graphics adapter. It will be appreciated that not all digital devices 800 comprise either the I/O interface 810 or the display interface 812.

In some embodiments, the acts, methods, and processes described herein are implemented within, or using, software modules (programs) that are executed by one or more general purpose computers. The software modules may be stored on or within any suitable computer-readable medium. It should be understood that the various steps may alternatively be implemented in-whole or in-part within specially designed hardware. The skilled artisan will recognize that not all calculations, analyses and/or optimization require the use of computers, though any of the above-described methods, calculations or analyses can be facilitated through the use of computers.

Although the invention(s) have been disclosed in the context of certain preferred embodiments and examples, it will be understood by those skilled in the art that the present invention(s) extend beyond the specifically disclosed embodiments to other alternative embodiments and/or uses of the invention(s) and obvious modifications and equivalents thereof. The skilled artisan will recognize that any of the above-described methods can be carried out using any appropriate apparatus.

Thus, it is intended that the scope of the present invention(s) herein disclosed should not be limited by the particular disclosed embodiments described above, but should be determined only by a fair reading of the claims that follow.

What is claimed:

1. A method comprising:
forecasting a foreign exchange exposure for a first period of time;
forecasting a foreign exchange exposure for a second period of time, the second period of time comprising a termination date of the first period of time and a termination date of the second period of time;
hedging, by a computer with a processor and memory, risk of the foreign exchange exposure for the second period of time, the hedging based on the forecasts of the foreign exchange exposure for the first and second periods of time, wherein the hedging is performed utilizing currency contracts with a single maturity date in a single month;
retrieving, by the computer, information in real-time from a database of foreign currency contracts to confirm that the risk based on the forecast of the foreign exchange exposure for the second period of time has been hedged;
monitoring changes in foreign exchange exposure that alter the forecast of the foreign exchange exposure for the second period of time;
hedging, by the computer, changes in foreign exchange exposure that result from changes in the forecast of the foreign exchange exposure for the second period of time, wherein the hedging is performed utilizing the currency contracts with the single maturity date in the single month; and
displaying, by a display, a comparison of results of hedging with results of accounting from an enterprise resource planning (ERP) system.

2. The method of claim 1, wherein forecasting the foreign exchange exposure for the first period of time comprises:
receiving assets and liabilities reflected in a balance sheet for a first date, the assets and liabilities being expressed in a foreign currency; and
forecasting the foreign exchange exposure for the first period of time based on the assets and liabilities.

3. The method of claim 2, wherein forecasting the foreign exchange exposure for the first period of time further comprises:
receiving revenue and expenses forecasts from an income statement forecast for a remainder of the first period of time, the revenue and expenses forecasts being expressed in the foreign currency; and
adjusting the forecast of the foreign exchange exposure for the first period of time based on the revenue and expenses forecasts.

4. The method of claim 2, wherein forecasting the foreign exchange exposure for the second period of time comprises:
receiving non-functional currency needs for the second period of time; and
adjusting the forecast for the foreign exchange exposure for the second period of time based on the non-functional currency needs.

5. The method of claim 4, further comprising adjusting the currency contracts with the single maturity date in the single month, the adjusting being based on the non-functional currency needs for the second period of time.

6. The method of claim 1, further comprising:
receiving accruals forecasts for a remainder of the first period of time; and
adjusting the forecast of the foreign exchange exposure for the first period of time based on the accruals forecasts.

7. The method of claim 1, wherein forecasting the foreign exchange exposure for the second period of time comprises:
forecasting the foreign exchange exposure for the second period of time based on assets and liabilities for the first period of time.

8. The method of claim 7, wherein forecasting the foreign exchange exposure for the second period of time further comprises:
receiving revenue and expenses forecasts reflected in an income statement forecast for the second period of time, the revenue and expenses forecasts being expressed in the foreign currency; and
adjusting the forecast of the foreign exchange exposure for the second period of time based on the revenue and expenses forecasts.

9. The method of claim 1, further comprising:
receiving accruals forecasts for the second period of time; and
adjusting the forecast of the foreign exchange exposure for the second period of time based on the accruals forecasts.

10. The method of claim 1, wherein the database of foreign currency contracts is a Treasury Management System (TMS).

11. A system comprising:
a processor;
memory coupled to the processor;
a balance sheet forecast calculation module coupled to the processor, the balance sheet forecast calculation module configured to:
  forecast a foreign exchange exposure for a first period of time;
  forecast a foreign exchange exposure for a second period of time, the second period of time comprising a termination date of the first period of time and a termination date of the second period of time;
  hedge risk of the foreign exchange exposure for the second period of time, the hedge being based on the forecasts of the foreign exchange exposure for the first and second periods of time, wherein the hedging is performed utilizing currency contracts with a single maturity date in a single month; and
  hedge changes in foreign exchange exposure that result from changes in the forecast of the foreign exchange exposure for the second period of time, wherein the hedge is performed utilizing the currency contracts with the single maturity date in the single month;
anFX contract retrieval module coupled to the processor, the FX contract retrieval module configured to retrieve information in real-time from a database of foreign currency contracts to confirm that the risk based on the forecast of the foreign exchange exposure for the second period of time has been hedged; and
a display configured to display a comparison of results of hedging with results of accounting from an enterprise resource planning (ERP) system.

12. The system of claim 11, wherein the balance sheet forecast calculation module configured to forecast the foreign exchange exposure for the first period of time comprises the balance sheet forecast calculation module being configured to:
receive assets and liabilities reflected in a balance sheet for a first date, the assets and liabilities being expressed in a foreign currency; and
forecast the foreign exchange exposure for the first period of time based on the assets and liabilities.

13. The system of claim 12, wherein the balance sheet forecast calculation module configured to forecast the foreign exchange exposure for the first period of time further comprises the balance sheet forecast calculation module being configured to:
- receive revenue and expense forecasts from an income statement forecast for the remainder of the first period, the revenue and expense forecasts being expressed in the foreign currency; and
- adjust the forecast of the foreign exchange exposure for the first period of time based on the revenue and expense forecasts.

14. The system of claim 12, wherein the balance sheet forecast calculation module configured to forecast the foreign exchange exposure for the second period of time comprises the balance sheet forecast calculation module being configured to receive non-functional currency needs for the second period of time and to adjust the forecast for the foreign exchange exposure for the second period of time based on the non-functional currency needs.

15. The system of claim 14, wherein the balance sheet forecast calculation module is further configured to adjust the currency contracts with the single maturity date in the single month, the adjusting being based on the non-functional currency needs for the second period of time.

16. The system of claim 11, wherein the balance sheet forecast calculation module is further configured to receive accruals forecasts for a remainder of the first period of time and adjust the forecast of the foreign exchange exposure for the first period of time based on the accruals forecasts.

17. The system of claim 11, wherein the balance sheet forecast calculation module configured to forecast the foreign exchange exposure for the second period of time comprises the balance sheet forecast calculation module being configured to forecast the foreign exchange exposure for the second period of time based on assets and liabilities for the first period of time.

18. The system of claim 17, wherein the balance sheet forecast calculation module configured to forecast the foreign exchange exposure for the second period of time comprises the balance sheet forecast calculation module being configured to: receive revenue and expenses forecasts reflected in an income statement forecast for the second period of time, the revenue and expenses forecasts being expressed in the foreign currency; and adjust the forecast of the foreign exchange exposure for the second period of time based on the revenue and expenses forecasts.

19. The system of claim 11, wherein the balance sheet forecast calculation module is further configured to receive accruals forecasts for the second period of time and to adjust the forecast of the foreign exchange exposure for the second period of time based on the accruals forecasts.

20. The system of claim 11, wherein the database of foreign currency contracts is a Treasury Management System (TMS).

21. A non-transitory computer readable medium comprising instructions executable by a processor to perform a method, the method comprising:
- forecasting a foreign exchange exposure for a first period of time;
- forecasting a foreign exchange exposure for a second period of time, the second period of time comprising a termination date of the first period of time and a termination date of the second period of time;
- hedging risk of the foreign exchange exposure for the second period of time, the hedging based on the forecasts of the foreign exchange exposure for the first and second periods of time, wherein the hedging is performed utilizing currency contracts with a single maturity date in a single month;
- retrieving information in real-time from a database of foreign currency contracts to confirm that the risk based on the forecast of the foreign exchange exposure for the second period of time has been hedged;
- monitoring changes in foreign exchange exposure that alter the forecasting of the foreign exchange exposure for the second period of time;
- hedging changes in foreign exchange exposure that may result from changes in the forecast of the foreign exchange exposure for the second period of time, wherein the hedging is performed utilizing the currency contracts with the single maturity date in the single month; and
- displaying a comparison of results of hedging with results of accounting from an enterprise resource planning (ERP) system.

* * * * *